United States Patent [19]

Sugita et al.

[11] Patent Number: 5,418,059
[45] Date of Patent: May 23, 1995

[54] MAGNETIC RECORDING MEDIUM AND METHOD FOR PRODUCING THE SAME

[75] Inventors: Ryuji Sugita; Kiyokazu Tohma; Tatsuaki Ishida; Yasuaki Ban, all of Osaka, Japan

[73] Assignee: Matsushita Electric Industrial Co., Ltd., Japan

[21] Appl. No.: 70,981

[22] Filed: Jun. 4, 1993

[30] Foreign Application Priority Data

Jun. 5, 1992 [JP] Japan .................................. 4-145294

[51] Int. Cl.6 ................................................. G11B 5/00
[52] U.S. Cl. ...................................... 428/332; 428/336; 428/611; 428/678; 428/694 T; 428/694 TM; 428/694 TS
[58] Field of Search ............ 428/694 T, 694 TM, 900, 428/694 TS, 332, 336, 611, 678; 427/131, 132, 248.1, 250

[56] References Cited

U.S. PATENT DOCUMENTS

| | | | |
|---|---|---|---|
| 4,387,136 | 7/1983 | Saito et al. | 428/328 |
| 4,511,635 | 4/1985 | Nagao et al. | 428/694 |
| 4,550,062 | 10/1985 | Takayama et al. | 428/611 |
| 4,749,628 | 7/1988 | Ahlert et al. | 428/660 |
| 4,855,175 | 8/1989 | Wakai et al. | 428/148 |

FOREIGN PATENT DOCUMENTS 0468488 1/1992 European Pat. Off.

*Primary Examiner*—Paul J. Thibodeau
*Assistant Examiner*—Leszek Kiliman
*Attorney, Agent, or Firm*—Wenderoth, Lind & Ponack

[57] ABSTRACT

A magnetic recording medium having a nonmagnetic substrate, a first magnetic layer which is formed on a surface of the substrate, has an axis of easy magnetization slanting from a normal line of a layer plane, contains cobalt and oxygen in an amount of not more than 40 atomic % and has a thickness of not larger than 0.15 $\mu$m, and a second magnetic layer which is formed on a surface of the first magnetic layer, contains cobalt, has an axis of easy magnetization slanting from a normal line of a layer plane, contains oxygen in an amount of not larger than 37 atomic % and from 61 % to 99 % of the oxygen concentration in the first layer, and has a thickness of not larger than 0.15 $\mu$m, which medium has a large S/N ratio.

4 Claims, 2 Drawing Sheets

MAGNETIC RECORDING MEDIUM AND METHOD FOR PRODUCING THE SAME

BACKGROUND OF THE INVENTION

1. Field of the Invention

The present, invention relates to a magnetic recording medium which achieves a high S/N ratio and a method for producing the same.

2. Description of the Related Art

As a recording density of a magnetic recording/reproducing equipment has been increased year by year, it is highly desired to provide a magnetic recording medium which is excellent in recording and reproducing characteristics in a short wavelength range. Today, a coating type magnetic recording medium in which magnetic powder is coated on a substrate is mainly used, and its properties are being improved to satisfy the above desire However, the improvement of the properties is nearing its limit.

One of magnetic recording media which can exceed this limit is a thin film magnetic recording medium. The thin film magnetic recording medium is produced by a vacuum deposition method, a puttering method or a plating method and has excellent recording and reproducing characteristics in a short wavelength range. Examples of magnetic materials used in the thin film magnetic recording medium are Co, Co-Ni, Co-Ni-P, Co-0, CoNi-0, Co-Cr, Co-Ni-Cr and the like.

In the practical production of magnetic tapes, the vacuum deposition method is most suitable, and a deposition tape comprising a Co-Ni-O magnetic layer is practically used as a Hi-8 type video tape.

One embodiment of the production method of a deposition tape will be explained by making reference to FIG. 1, which schematically illustrates an inner structure of a vacuum deposition apparatus.

A substrate 1 made of, for example, a polymer film is unwound from a supply roll 4, travels around a peripheral surface of a cylindrical can 2 in a direction of an arrow 6, and finally wound on a take-up roll 5.

A vapor 9 of a raw magnetic material 7 such as metal cobalt or a cobalt alloy is evaporated from an evaporation source 8 and deposited on the substrate 1 to form a magnetic layer on the substrate 1. As the evaporation source 8, an electron beam evaporation source is preferred, since it can evaporate a high melting point metal such as Co at a high evaporations rate.

Between the evaporation source 8 and the cylindrical can 2, there are provided shielding plates 3A and 3B, which prevent excessive deposition of the evaporated atoms on the substrate.

Oxygen gas is supplied in a vacuum chamber from a nozzle 10 during the vapor deposition of the magnetic material.

The Hi-8 type video tape which is now commercially sold is usually produced by the above described apparatus.

In the Co-O or Co-Ni-O magnetic layer formed by the above method, an axis of easy magnetization slants at a certain angle from a normal line of the film plane. That is, the axis of easy magnetization is not on the normal line of the film plane but slants from the normal line in a plane including an injection direction of the atom vapor onto the substrate. In the commercially sold Hi-8 video tape, an axis of easy magnetization slants at about 70° from the normal line of a magnetic layer in a plane including a longitudinal direction of the tape. The longitudinal direction of the tape corresponds to the running direction of the substrate in FIG. 1.

In future, a magnetic recording/reproducing apparatus will have a smaller size and a larger capacity. To realize this, a linear recording density and a track density of the magnetic recording medium should be increased. Then, in the case of a magnetic tape, a high S/N ratio in particular in a short wavelength range should be increased.

SUMMARY OF THE INVENTION

An object of the present invention is to provide a magnetic recording medium which achieves a high S/N ratio.

Another object of the present invention is to provide a method for producing a magnetic recording medium which achieves a high S/N ratio.

According to the present invention, there is provided a magnetic recording medium comprising a nonmagnetic substrate, a first magnetic layer which is formed on a surface of said substrate, comprises cobalt, has an axis of easy magnetization slanting from a normal line of a layer plane, contains oxygen in an amount of not more than 40 atomic % and has a thickness of not larger than 0.15 $\mu$m, and a second magnetic layer which is formed on a surface of said first magnetic layer, comprises cobalt, has an axis of easy magnetization slanting from a normal line of a layer plane, contains oxygen in an, amount of not larger than 37 atomic % and from 61 % to 99 % of the oxygen concentration in said first layer, and has a thickness of not larger than 0.15 $\mu$m.

With such magnetic recording medium, a reproducing output is increased and a level of noise is decreased, so that a high S/N ratio is achieved.

DETAILED DESCRIPTION OF THE INVENTION

Figure 1:
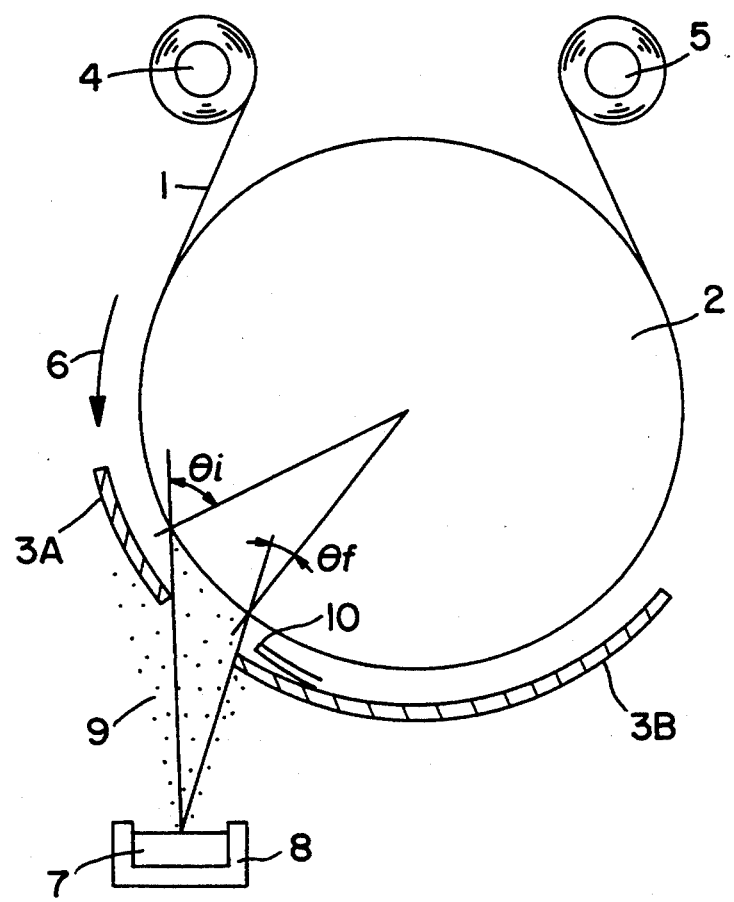
FIG. 1 schematically shows an embodiment of a vacuum deposition apparatus for producing a deposition magnetic recording medium, and FIG. 2 schematically shows another embodiment of a vacuum deposition apparatus for producing a deposition magnetic recording medium.

First, an example of a method for producing a magnetic recording medium according to the present invention is explained by making reference to FIG. 1.

To form the first magnetic layer, the substrate 1 is traveled around the peripheral surface of the cylindrical can 2 in the direction of the arrow 6. Between the evaporation source 8 and the cylindrical can 2, the shielding plates 3A and 3B are provided. Through a gap between two shielding plates 3A and 3B, the metal vapor 9 are deposited on the surface of substrate 1.

As the evaporation raw material 7, a bulk of Co or a Co alloy such as Co-Ni is filled in the evaporation source 8. During the deposition of the metal, the oxygen gas is suppled from the nozzle 10.

$\Theta_i$ and $\Theta_f$ represent incident angles at which the metal vapor 9 is impinged on the substrate at a deposition initiating point and deposition finishing point, respectively.

The substrate 1 carrying the first magnetic layer is wound on the take-up roll 5. The substrate 1 is then unwound from the take,up roll 5, travels around the peripheral surface of the cab 2 in the direction reverse to the direction of arrow 6 and wound on the supply roll 4. In this step, a heat source for the evaporation source is off to stop the evaporation of the metal raw material 7, or the gap between the shielding plates 3A and 3B is closed with a shutter (not shown) to prevent the deposition of the metal vapor.

To form the second magnetic layer on the first magnetic layer, the Substrate 1 is unwound from the supply roll 4 and travels around the peripheral surface of the can 2 in the same manner as in the step for the formation of the first magnetic layer.

Both in the formations of the first and second magnetic layers, preferably $\Theta_i$ is 85° or less and $\Theta_f$ is 35° or larger. When $\Theta_i$ exceeds 85°, a magnetic anisotropy energy is weak so that the reproducing output tends to decrease. It is essential to maintain $\Theta_f$ of at least 35°. Otherwise, the axis Of easy magnetization approaches too closely to the normal line of the film plane so that the reproducing output decreases.

In the step of the formation of second magnetic layer, an amount of the oxygen gas from the nozzle 10 is adjusted so that the oxygen concentration in the second magnetic layer is from 61 to 99 % of that in the first magnetic layer.

Alternatively, after the formation of the first and second magnetic layers, the oxygen concentration in the second magnetic layer may be adjusted in the above range by removing oxygen atoms from a part corresponding to the second magnetic layer near its surface.

The oxygen concentration in the magnetic layer can be quantitatively measured by an Auger electron spectroscopy or a Rutherford back scattering analysis.

Now, a relationship between the oxygen concentrations in the first and second magnetic layers and the reproducing characteristics of the magnetic recording medium is explained.

Four magnetic recording media were produced. In the first one (No. 1) according to the present invention, oxygen concentrations in the first and second magnetic layers were 30 atomic % and 23 atomic %, respectively, in the second one (No. 2A), those in the first and second magnetic layers were both 30 atomic %, in the third one (No. 2B), those in the first and second magnetic layers were both 23 atomic % and in the fourth one (No. 3), those in the first and second magnetic layers were 23 atomic % and 30 atomic %, respectively. With these magnetic recording media, the reproducing output and the noise were measured. The reproducing output was measured by recording and reproducing a signal having a wavelength of 0.5 μm, and the noise was measured at a frequency corresponding to the wavelength of 0.6 μm when a signal of 0.5 μm was recorded and reproduced. The results are shown in the Table. All the results are expressed as relative values with the reproducing output and the noise of No. 1 medium being O dB.

TABLE

| Medium No. | Reproducing output (dB) | Noise (dB) |
|---|---|---|
| 1 | 0 | 0 |
| 2A | −3 | −1 |
| 2B | 0 | +2 |
| 3 | −2 | 0 |

The reason why the reproducing output of No. 1 was larger than No. 2A may be that, since the oxygen concentration near the surface of magnetic layer, which has the largest influence on the reproducing output, in No. 1 was smaller than in No. 2A, the saturation magnetization near the surface of magnetic layer in No. 1 would be larger than in No. 2A so that an amount of recording magnetization would increase in No. 1. The reason why the noise in No. 1 is larger than in No. 2A may be because of difference of average saturation magnetization in the magnetic layer. However, a difference of the reproducing output was larger than that of the noise between No. 1 and No. 2A, the S/N ratio in No. 1 was larger than that in No. 2A.

The reason why the reproducing outputs of No. 1 and No. 2B were the same may be that the oxygen concentration near the surface of magnetic layer was the same in No. 1 and No. 2B so that the amount of recording magnetization would be substantially the same in No. 1 and No. 2B. The reason why the noise in No. 1 was lower than in No. 2B is that the average saturation magnetization in No. 1 was lower than in No. 2B. Accordingly, the S/N ratio in No. 1 was larger than that in No. 2B since the noise in No. 1 was smaller than in No. 2B.

The reason why the reproducing output in No. 1 was larger than in No. 3 is that the oxygen concentration near the surface of magnetic layer in No. 1 was lower than in No. 3 so that the saturation magnetization in No. 1 was larger than in No. 3. Since the average saturation magnetization was the same, the noise was substantially the same.

As explained in the above, the magnetic recording medium according to the present invention has the highest S/N ratio among the slant deposition magnetic recording media having the two layer structure magnetic layer containing oxygen.

The above relationship in the recording and reproducing characteristics is also found when the oxygen concentration in the first magnetic layer is 40 atomic % or less, the oxygen concentration in the second magnetic layer is 37 atomic % or less and from 61 to 99 % of the oxygen concentration in the first magnetic layer, and each of the magnetic layers has a thickness of 0.15 m or less. When one of these properties is outside the above range, the S/N ratio decreases.

For example, when the oxygen concentration in the first magnetic layer exceeds 40 atomic % or when that in the second magnetic layer exceeds 37 atomic % the saturation magnetization is too small so that the reproducing output decreases. When the oxygen concentration in the second magnetic layer is less than 61% of that in the first magnetic layer, the reproducing output decreases also. A cause for this may be too large difference of the magnetic properties between the first and second magnetic layers. When either one of the thicknesses of the first and second magnetic layers exceeds 0.15 μm, the noise increases so that the high S/N ratio is not achieved. The thickness of each magnetic layer is preferably at least 0.03 μm. Preferably, the thickness of each magnetic layer does not exceed 0.10 μm, in particular, 0.08 μm.

When either one of the oxygen concentrations in the first and second magnetic layers is less than 10 atomic %, the noise tends to increase, and corrosion resistance and durability of the magnetic recording medium may be deteriorated. Therefore, the oxygen concentration is preferably at least 10 atomic %.

When a coercive force in the longitudinal direction of the first magnetic layer is made larger than that in the longitudinal direction of the second layer, the output is further improved. To achieve such relationship of the coercive forces between the first and second magnetic layers, the impinging angle during the formation of the first magnetic layer is made larger than that during the formation of the second magnetic layer, or a substrate temperature during the formation of the first magnetic layer is kept higher than that during the formation of the second layer, or the amount of oxygen to be supplied is suitably adjusted.

For example, the coercive force in the longitudinal direction of the first layer is 1800 He and that in the longitudinal direction of the second magnetic layer is 1600 Oe, the output is about 1 dB higher than when the coercive forces in the longitudinal directions of the first and second magnetic layer are the same at 1800 Oe or 1600 Oe. The reason for such effect may be an effect of a recording demagnetization function. That is, when the coercive force in the longitudinal direction of the first magnetic layer is made larger than that in the longitudinal direction of the second magnetic layer, the recording demagnetization may be decreased, so that intense recording magnetization may remain.

The phenomenon that the lower coercive force in the upper magnetic layer achieves the higher reproducing output in the two magnetic layer recording medium is contrary to the conventional knowledge found in the magnetic recording medium which records the signals in the longitudinal direction. This may be because, in the magnetic recording medium of the present invention, the axis of easy magnetization slants from the normal line of the film plane.

When a cobalt oxide-containing layer is formed on the substrate and then the first and second magnetic layer are successively formed, the magnetic properties and their reproducibility of the first magnetic layer are greatly improved. The cobalt oxide-containing layer may be formed in the same manner as the first and second magnetic layers except that an amount of the oxygen gas is adjusted so that cobalt oxide is generated in the deposited layer. In addition to cobalt oxide nickel oxide or other methal oxide may be contained in the layer.

The cobalt oxide-containing layer has a columnar structure. When an axis of each columnar grain slants by 40° or less from the normal line of the film plane, the magnetic properties and their reproducibility are further stabilized.

A preferred example of this embodiment will be explained.

Using the apparatus of FIG. 1, a CoO layer was formed on the substrate 1.

Metal cobalt as the raw material 7 was filled in the evaporation source 8 and vaporized. The cylindrical can 2 had a diameter of 1 m and its surface temperature was kept at room temperature. As the substrate 1, a polyethylene terephthalate film having a thickness of 7 μm was used. $\Theta_i$ and $\Theta_f$ were set at 35° and 20° respectively From the nozzle 10, the oxygen gas was supplied in the vacuum chamber at a flow rate of 3 liter/min. Under the above conditions, at an average deposition rate of 0.5 μm/sec, the CoO layer having a thickness of 0.02 μm was formed. This CoO film had a columnar structure and its slanting angles from the normal line of the film plane was about 20°.

The substrate 1 carrying the CoO layer which was once wound on the take-up roll 5 was rewound on the supply roll 4. During rewiding, the gap between the shielding plates 3A and 3B was closed with a shutter (not shown).

Then, the first magnetic layer was formed. As the raw material 7, metal cobalt which was used for the formulation of the CoO layer was used. The surface of the can 2 kept at room temperature. $\Theta_i$ and $\Theta_f$ were set at 75° and 55° respectively The flow rate of the oxygen gas from the nozzle 10 was 1.2 liter/min. Under these conditions, at an average deposition rate of 0.3 μm/sec., the first magnetic layer having a thickness of 0.06 μm was formed.

The substrate 1 carrying the CoO layer and the first magnetic layer which was once wound on the take-up roll 5 was rewound on the supply roll 4. During rewinding, the gap between the shielding plates 3A and 3B was closed with a shutter (not shown).

Finally, the second magnetic layer was formed. As the raw material 7, etal cobalt which was already filled in the source 8 was used. The surface of the can 2 kept at room temperature. $\Theta_i$ and $\Theta_f$ were set at 75° and 55°, respectively. The flow rate of the oxygen gas from the nozzle 10 was 0.8 liter/min. Under these conditions, at an average deposition rate of 0.3 μm/sec., the second magnetic layer having a thickness of 0.06 μm was formed.

The oxygen concentrations in the first and second magnetic layers were measured by the Rutherford back scattering analysis to find that they were 30 atomic % and 22 atomic %, respectively.

On the second magnetic layer, a carbon film having a thickness of 0.01 μm as a protective layer and a fluorine-containing lubricant were applied, and the substrate was slit at a width of 8 mm to produce a 8 mm video tape. The recording and reproducing characteristics of the video tape were evaluated using a ring-type magnetic head made of Sendust having a gap of 0.15 μm.

The reproducing output of this video tape was higher than that of a commercially available deposition Hi-8 video tape by 3 dB, 6 dB and 8 dB at recording wavelengths of 3.8 μm, 0.54 μm and 0.38 μm, respectively. The noise of this video tape was lower than that of the commercially available Hi-8 video tape by about 1 dB in the whole wavelength range. Accordingly, the video tape of the present invention had a greatly improved S/N ratio in comparison with the conventional deposition tape.

When other production conditions, other production method or other composition are employed, the high S/N ratio can be achieved insofar as the oxygen concentration in the second magnetic layer is from 61 to 99 % of that in the first magnetic layer.

Another production method of the magnetic recording medium according to the present invention will be explained by making reference to FIG. 2.

Figure 2:
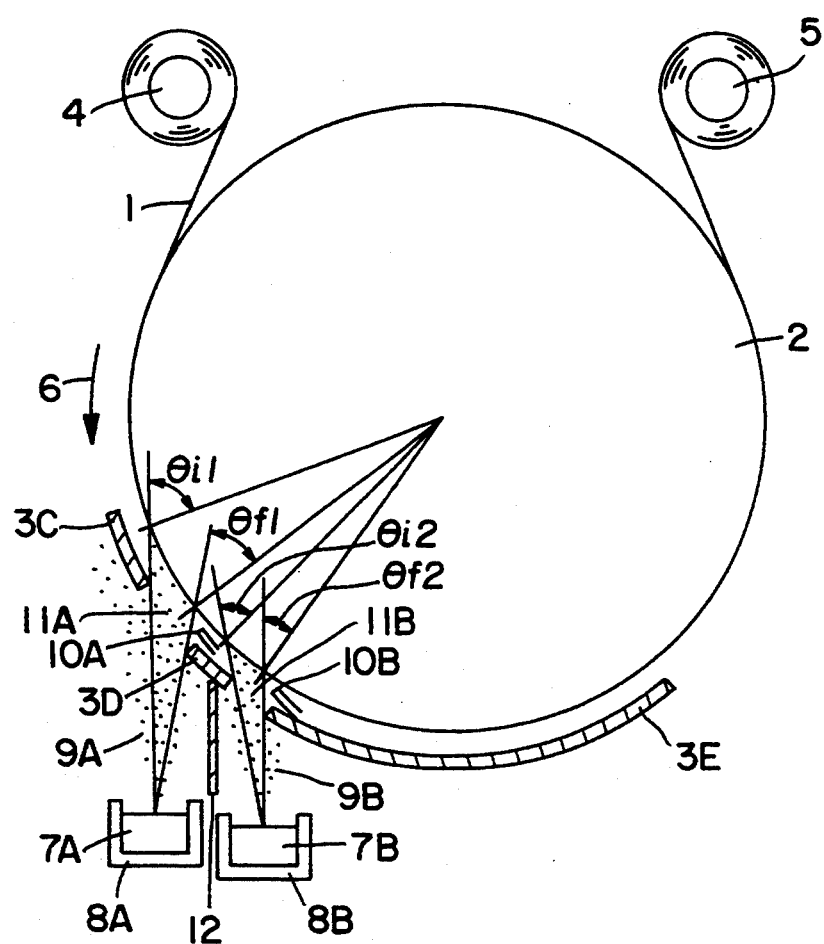

The apparatus of FIG. 2 has substantially the same structure as that of FIG. 1 except that two evaporation sources 8A and 8B so that the first and second magnetic layers can be formed in a single traveling of the substrate. That is, metal vapor 9A evaporated from a raw material 7A contained in an evaporation source 8A passes through an opening 11A between shielding plates 3C and 3D and is deposited on the substrate to form the first magnetic layer. Metal vapor 9B evaporated from a raw material 7B contained in an evaporation source 8B passes through an opening 11B between shielding plates 3D and 3E and is deposited on the first magnetic layer to form the second magnetic layer.

The oxygen gas is supplied to the metal vapors 9A and 9B from nozzles 10A and 10B, respectively. Mixing of the metal vapors 9A and 9B is prevented by a plate 12.

$\Theta_{i1}$ and $\Theta_{f1}$ represent incident angles at which the metal vapor 9A is impinged on the substrate at a deposition initiating point and a deposition finishing point, respectively in the formation of the first magnetic layer. $\Theta_{i2}$ and $\Theta_{f2}$ represent incident angles at which the metal vapor 9B is impinged on the substrate at a deposition initiating point and a deposition finishing point, respectively in the formation of the second magnetic layer.

As in FIG. 1, the substrate 1 travels in the direction of the arrow 6.

A production example using the vacuum deposition apparatus of FIG. 2 will be explained.

Using the apparatus of FIG. 2, a CoO layer was formed on the substrate 1.

Metal cobalt as the raw material 7B was filled in the evaporation source 8B and vaporized. An electrical source for the evaporation source 8A was off. The cylindrical can 2 had a diameter of 1.5 m and its surface temperature was kept at 80° C. As the substrate 1, a polyethylene naphthalate film having a thickness of 7 $\mu$m was used. $\Theta_{i2}$ and $\Theta_{f2}$ were set at 35° and 20°, respectively. From the nozzle 10B, the oxygen gas was supplied in the vacuum chamber at a flow rate of 3 liter/min. Under the above conditions, at an average deposition rate of 0.5 $\mu$m/sec., the CoO layer having a thickness of 0.02 $\mu$m was formed. This CoO film had a columnar structure and its slanting angles from the normal line of the film plane was about 20°.

The substrate 1 carrying the CoO layer which was once wound on the take-up roll 5 was rewound on the supply roll 4. During rewiding, the openings 11A and 11B between the shielding plates :were closed with respective shutters (not shown).

Then, the first magnetic layer was formed. As the raw materials 7A and 7B, metal cobalt was used. The surface of the can 2 was kept at 80° C. $\Theta_{i1}$ and $\Theta_{f1}$ were set at 80° and 60° respectively, and $\Theta_{i2}$ and $\Theta_{f2}$ were set at 75° and 55°, respectively The flow rates of the oxygen gas from the nozzles 10A and 10B were 1.0 liter/min. and 0.7 liter/min., respectively. Under these conditions, at an average deposition rate of 0.3 $\mu$m/sec., the first and second magnetic layers having thicknesses of 0.07 $\mu$m and 0.05 $\mu$m, respectively were formed.

The oxygen concentrations in the first and second magnetic layers were measured by the Rutherford back scattering analysis to find that they were 27 atomic % and 21 atomic %, respectively.

On the second magnetic layer, a carbon film having a thickness of 0.01 $\mu$m as a protective layer and a fluorine-containing lubricant were applied, and the substrate was slit at a width of 8 mm to produce a 8 mm video tape. The recording and reproducing characteristics of the video tape were evaluated using a ring-type magnetic head made of Sendust having a gap of 0.15 m.

The reproducing output of this video tape was higher than that of a commercially available deposition Hi-8 video tape by 3 dB, 7 dB and 9 dB at recording wavelengths of 3.8 m, 0.54 $\mu$m and 0.38 $\mu$m, respectively. The noise of this video tape was lower than that of the commercially available Hi-8 video tape by about 1 dB in the whole wave-length range. Accordingly, the video tape of the present invention had a greatly improved S/N ratio in comparison with the conventional deposition tape.

While in the above examples, Co-O was used as the magnetic material, the high S/N ratio can be achieved when Co-Ni-O, Co-Fe-O or Co-Ni-Fe-O is used insofar as the requirements of the present invention are fulfilled.

While the polyethylene terephthalate or polyethylene naphthalate film was used in the above Examples, other conventional polymer in films such as a polyimide film, a polyamide film, a polyetherimide film and the like may be used as the substrate.

In addition to the first and second magnetic layer, the magnetic recording medium of the present invention may have a nonmagnetic intermediate layer between the first and second layer, whereby the noise can be further decreased. A thickness of the intermediate layer is preferably 0.03 $\mu$m or less. Otherwise the reproducing output may be decreased. The nonmagnetic intermediate layer can be formed from cobalt oxide, cobalt oxide/nickel oxide, titanium, cromium, titanium oxide, cromium oxide, aluminum, aluminum oxide, and the like.

What is claimed is:

1. A magnetic recording medium comprising a nonmagnetic substrate; a first magnetic layer which is formed on a surface of said substrate, comprises cobalt, has an axis of easy magnetization slanting from a normal line of a layer plane, contains oxygen in an amount of 10 to 40 atomic % and has a thickness of not larger than 0.15 $\mu$m; and a second magnetic layer which is formed on a surface of said first magnetic layer, comprises cobalt, has an axis of easy magnetization slanting from a normal line of a layer plane, contains oxygen in an amount of 10 to 37 atomic % and from 61 % to 99 % of the oxygen concentration in said first layer, and has a thickness of not larger than 0.15 $\mu$m.

2. The magnetic recording medium according to claim 1, wherein the coercive force of said first magnetic layer in a longitudinal direction is larger than that of said second magnetic layer in a longitudinal direction.

3. The magnetic recording medium according to claim 1, which further comprises a cobalt oxide-containing layer between said nonmagnetic substrate and said first magnetic layer.

4. The magnetic recording medium according to claim 3, wherein said cobalt oxide-containing layer has a columnar structure, and its columnar grain slants at an angle of not larger than 40° from a normal line of said substrate plane.

* * * * *